United States Patent
Penberthy et al.

[15] 3,664,425
[45] May 23, 1972

[54] WELL INSULATION METHOD

[72] Inventors: Walter L. Penberthy; Jack H. Bayless; Robert C. Ayers, Jr., all of Houston, Tex.

[73] Assignee: Esso Production Research Company

[22] Filed: Dec. 21, 1970

[21] Appl. No.: 100,499

[52] U.S. Cl. ........................................................... 166/303
[51] Int. Cl. .................................................................E21b 43/24
[58] Field of Search ................ 166/57, 208, 302, 303, DIG. 1

[56] References Cited

UNITED STATES PATENTS

| | | | |
|---|---|---|---|
| 3,410,344 | 11/1968 | Cornelius | 166/303 |
| 3,438,442 | 4/1969 | Pryor | 166/303 |
| 3,451,479 | 6/1969 | Parker | 166/303 |
| 3,825,399 | 8/1970 | Bayless | 166/303 |

*Primary Examiner*—Robert L. Wolfe
*Attorney*—James A. Reilly, John B. Davison, Lewis H. Eatherton, James E. Gilchrist, Robert L. Graham and James E. Reed

[57] ABSTRACT

A method for thermally insulating a well which may be used in a thermal process for oil recovery. The well is insulated by boiling a solution containing a water-soluble alkali metal silicate and a foaming agent in contact with the well tubing to form a coating of alkali metal silicate on the tubing. The foaming agent assists in removing excess silicate solution from the well annulus and improves the quality of the coating on the tubing.

10 Claims, No Drawings

3,664,425

WELL INSULATION METHOD

BACKGROUND OF THE INVENTION

1. Field of the Invention

This invention relates to a process for thermally insulating a well. More particularly, this invention relates to a process for insulating a well with an aqueous solution containing a water-soluble silicate and a foaming agent.

2. Description of the Prior Art

Among the more promising methods that have been suggested or tried for the recovery of oil from viscous oil reservoirs are those which introduce thermal energy into the reservoirs. The thermal energy may be in a variety of forms such as hot water, in situ combustion, steam and the like. Each of these thermal energy agents may be useful under certain conditions. However, steam is generally the most efficient and economical and is clearly the most widely employed thermal energy agent.

One thermal oil recovery technique which utilizes steam is the "steam-drive" process. In this process, steam is injected into one well and drives oil before it to a second producing well. In another method, commonly called the "huff-and-puff" process, a single well is used for both steam injection and production of oil. The steam is injected through the tubing and into the formation. Injection is then interrupted and the well is permitted to heat-soak for a period of time. Following the heat-soak the well is placed on a production cycle, and the heated fluids are withdrawn by way of the well to the surface.

Steam injection can increase oil production through a number of mechanisms. The viscosity of most oils is strongly dependent upon its temperature. In many cases, the viscosity of the reservoir oil can be reduced by 100 fold or more if the temperature of the oil is increased several hundred degrees. Steam injection can have substantial benefits in recovering even relatively-light, low viscosity oils. This is particularly true where such oils exist in thick, low permeability sands where present fracturing techniques are not effective. In such cases, a minor reduction in viscosity of the reservoir oil can sharply increase productivity. Steam injection is also useful in removing wellbore damage at injection and producing wells. Such damage is often attributable to asphaltic or paraffinic components of the crude oil which clog the pore spaces of the reservoir sand in the immediate vicinity of the well. Steam injection can be used to remove these deposits from the wellbore.

Injection of high temperature steam which may be 650° F. or even higher does, however, present some special operational problems. When the steam is injected through the tubing, there may be substantial transfer of heat across the annular space to the well casing. When the well casing is firmly cemented into the wellbore, as it generally is, the thermally induced stresses may result in casing failure. Moreover, the primary object of any steam injection process is to transfer the thermal energy from the surface of the earth to the oil-bearing formation. Where significant quantities of thermal energy are lost as the steam travels through the tubing string, the process is naturally less efficient. On even a shallow well, the thermal losses of the steam during its travel down the tubing may be so high that the initially high temperature superheated or saturated steam will condense into hot water before reaching the formation. Such condensation represents a tremendous loss in the amount of thermal energy that the injected fluid is able to carry into the reservoir.

A number of proposals have been advanced to combat excessive heat losses in steam injection processes. It has been suggested that a temperature resistant, thermal packer be employed to isolate the annular space between the casing and injection tubing. Such equipment will reduce heat losses due to convection between the tubing string and the casing string by forming a closed dead-gas space in the annulus. Such specialized equipment is not only highly expensive, but does nothing to prevent radiant thermal losses from the injection tubing.

It has been suggested that the wells be completed with a bitumastic coating. This completion technique utilizes a material to coat the casing which will melt at high temperature. When melting occurs, the casing is free to expand, thus, relieving the stresses which would otherwise be placed on the casing due to an increase in its temperature. This method has not proven to be universally successful in preventing casing failure. In some instances, the formation may contact the casing with sufficient force to prevent free expansion and contraction of the casing during heating and cooling. Under these circumstances casing failure is possible due to the unrelieved stresses. Moreover, such a completion technique does nothing to prevent the loss of thermal energy from the injection tubing.

It has been suggested that an inert gas, such as nitrogen, be introduced into the annular space between the casing and tubing and pumped down the annulus to the formation. This method requires, however, a source of gas, means for pumping the gas down the annulus, and means for separating the inert gas from the produced well fluids.

A recent proposal has overcome many of the problems of these prior methods of combating excessive heat losses in a well. U.S. Pat. No. 3,525,399, issued Aug. 25, 1970, to Bayless and Penberthy teaches a method for coating a tubing string with an alkali metal silicate. In this method, the tubing string is run into the well and set in place with a packer. An aqueous solution of a water-soluble silicate is introduced into the annular space between the tubing string and the well. Steam is then injected through the tubing string to raise the temperature of the silicate solution in the annular space above its boiling point. Boiling of the silicate solution removes its water and deposits a coating of alkali metal silicate on the tubing string. The dehydrated silicate coating is a cellular solid or solid foam having a remarkably low thermal conductivity.

While this silicate insulation technique has proven to be remarkably efficient and inexpensive, some difficulty has been experienced in employing the technique. In some instances, particularly in wells of extreme depth, it may not be possible to remove all the liquid within the annular space by boiling. The coating may build up at a rapid rate on the tubing and insulate the annular space so effectively that the temperature of the liquid remaining in the annular space drops below its boiling point. While it has been suggested that this excess liquid may be removed from the annular space by employing a reverse circulating device in the tubing and displacing the remaining solution from the annular space it has been found that this displacement is at times difficult to accomplish. The remaining liquid may be highly viscous and cannot be effectively displaced with a gaseous displacing agent such as natural gas. Nor is water a totally satisfactory displacing agent. Although the dehydrated coating is not instantly soluble in water, it will deteriorate and dissolve when contacted by water for an extended period. Also, the length of time that the coating can resist deterioration by water is reduced by the relatively high temperature existing in the well following boiling of the silicate solution. Since a number of hours would be required to remove a fresh water displacing fluid from the annulus of a deep well, the use of water as a displacing fluid may cause deterioration of the silicate coating.

SUMMARY OF THE INVENTION

This invention relates to a process for thermally insulating elements of a well such as a tubing string. The tubing string is run into the well and set in place. An aqueous solution containing water-soluble silicate and a foaming agent is introduced into the annular space between the casing and the tubing string. Steam is injected into the tubing string to raise the temperature of the solution above its boiling point. Boiling of the solution removes its water and deposits a coating of alkali metal silicate on the tubing string. This boiling also causes the formation of a liquid foam within the annular space between the casing and tubing which assists in removing excess solution from the well. This liquid foam rises in the annular space and deposits additional quantities of alkali metal silicate solids on the coating on the tubing thereby increasing the quality of the coating.

DESCRIPTION OF THE PREFERRED EMBODIMENT

A preferred use for this invention is in insulating a conventional steam injection well. A brief description of such a well, as might be adapted for the practice of this invention, follows and will aid in the understanding of the invention.

The well is drilled from the surface of the earth to a subterranean oil-bearing formation and is generally lined with a number of joints of large diameter pipe commonly called a casing string. This casing string is cemented in place using conventional techniques and is perforated at the location of the oil-bearing formation to permit fluid communication between the formation and the interior of the casing. A length of small diameter pipe or tubing string is suspended from a wellhead at the surface of the earth and extends through the casing to the vicinity of the oil-bearing formation. Generally, centralizers will be secured to the tubing so that the tubing will be generally concentrically disposed with respect to the casing. A suitable packer, such as a thermal packer, is attached to the tubing string and seals the annular space between the tubing string and the casing at a location above the oil-bearing formation. The lower portion of the tubing string will extend below the packer and will have an opening which will permit the flow of fluids between the tubing string and the oil-bearing formation. A landing nipple is provided in the tubing string near its lower end which provides a seat for a blanking plug. Such a blanking plug is a conventional device which can be installed at the landing nipple to block fluid flow between the interior of the tubing and the oil-bearing formation and which can be removed by conventional wire line methods to reestablish such fluid communication. The tubing is also equipped with means for establishing fluid communication between the interior of the tubing and the tubing-casing annulus at a location above the packer assembly and above the landing nipple. A side pocket, gas-lift mandrel is a conventional device for such a purpose. A blanking or dummy valve may be inserted in the gas-lift mandrel to interrupt fluid flow between the tubing-casing annulus and the interior of the tubing string. When desired, such a valve may be removed to reestablish flow communication at this point. The wellhead at the surface of the earth seals the upper end of the tubing-casing annulus by means of suitable flanges. The wellhead is equipped with suitably valved, flow lines which are in fluid communication with the tubing string and with the casing-tubing annulus.

The foregoing description is illustrative of a well assembly which may be used in the practice of this invention. It should be understood, however, that this invention is not limited to the use of the specific well installation described and that other conventional assemblies may be satisfactorily employed.

In the practice of this invention, an aqueous solution of a water-soluble silicate and a foaming agent is displaced into the casing-tubing annular space above the packer assembly. Preferably, sufficient solution will be employed to fill this annular space. This solution may be introduced into the annulus by injection through the flow line in fluid communication with the annulus at the wellhead. It is preferred, however, to inject the solution down the tubing, through the gas-lift mandrel, and up the tubing-casing annulus. During this displacement operation, the blanking plug is seated in the landing nipple to prevent flow of the solution out of the bottom of the tubing, the gas-lift mandrel is open to fluid flow, and the wellhead flow line to the annulus is opened to vent fluids displaced by the solution.

Following placement of the solution in the annulus, a blind valve is installed in the gas-lift mandrel and the blanking plug is removed from the landing nipple. Thus, fluid flow between the tubing and the annulus is blocked and fluid flow between the tubing and the oil-bearing formation is established. Steam is then introduced into the tubing at the wellhead which flows through the tubing string and into the oil-bearing formation at the perforations in the casing. The valve on the annulus flow line at the wellhead is opened to vent the annular space.

The steam passing down the tubing will heat the solution in the annulus and cause it to boil near the tubing. This boiling will cause the deposition of a coating of cellular alkali metal silicate or silicate foam on the surface of the tubing and in conjunction with the foaming agent will create a head or column or liquid foam above the surface of the boiling liquid. During this heating and boiling operation, steam, excess silicate solution and a foam of steam and silicate solution will be discharged from the annulus by way of the vent line at the wellhead.

It is preferred to inject the steam at a relatively high temperature, approximately 600° F. and at a relatively high mass flow rate. The high temperatures and the high mass flow rates will permit rapid heating of the tubing string and will swiftly remove water from the silicate solution.

The silicates employed in the practice of this invention are those of the alkali metals which readily dissolve in water. This group is commonly termed the soluble silicates and includes any of the silicates of the alkali metals, with the exception of lithium. However, in the practice of this invention, it is preferred to employ silicate solutions containing sodium or potassium, as the alkali metal, due to the relatively low cost and ready commercial availability of such solutions.

When water is removed from solutions of the soluble silicates, they crystalize to form glass-like materials. When the soluble silicates are dried rapidly at boiling temperatures, the solutions intumesce and form a solid mass of bubbles having 30–100 times their original volume. The dried foam is a light weight glassy material having excellent structural and insulating properties.

In the practice of this invention, commercially available sodium silicate solutions have been found suitable. Such solutions have a density of approximately 40° B. at 20° C. and a silicate dioxide/sodium oxide weight ratio of approximately 3.2/1. Alternatively, commercially avaialble potassium silicate solutions may be employed. Commercial potassium silicate solutions have a density of approximately 30° B. at 20° C. and a silica dioxide/potassium oxide weight ratio of approximately 2.4/1. The silica dioxide/alkali metal oxide weight ratio is not critical to the practice of this invention and may range between 1.3/1 and 5.0/1. The density of the solutions may range between 22° B. and 50° B. at 20° C. It is only important that sufficient solids be contained in the solution so that upon boiling a coating of approximately one-eighth of an inch or greater will be deposited upon the tubing string.

As was previously noted, in some instances and particularly in wells of extreme depth, it is not always possible to boil off all of the liquid within the annular space in the absence of the foaming agent. The solid insulating foam on the tubing may build up at a rapid rate and insulate the annular space so effectively that the temperature of the liquid remaining in the annular space drops below its boiling point. At times, as much as one-half of the sodium silicate solution remains in the annulus after the formation of the insulating silicate foam on the tubing. It has now been found that most, if not all, of this excess solution can be removed from the wellbore by the addition of minor amounts of a foaming agent.

The principal function of the foaming agent used in the practice of this invention is to stabilize the foam generated by the steam bubbles evolved in the solution during the boiling operation. This will create a column or head of liquid-gas foam above the surface of the boiling liquid. A number of advantages accrue due to the use of this foaming agent. Because of the extended length of the foam column, more liquid is discharged from the annular space. Even in those instances where some excess liquid remains in the annulus as might occur in an extremely deep well, more liquid will be discharged with the use of the foaming agent than in its absence. Thus, less liquid would need to be displaced by prior methods. The operational advantages of this additional liquid discharge are obvious.

The foaming agent also appears to improve the quality of the insulating coating on the tubing. The coating formed in the presence of the foaming agent appears to have an improved cellular structure, to be more even, and to have a greater average thickness. The improvement in the quality of the coating may be due to a number of factors. The liquid foam may carry additional quantities of silicate solids up the annulus and deposit these solids on the previously formed insulating coating. This additional deposition would have the tendency to more evenly coat the tubing. It is also conceivable that the foaming agent stabilizes the bubbles of steam which are evolved in the semi-solid coating as it is being formed.

Foaming agents are well known to those skilled in the art and are extensively described in the literature. A vast number of substances are available to perform this function. Typical materials would include ionic surface active agents including the monovalent salts of fatty acids, of alkyl sulfates, and of alkyl ayrl sulfonates. Preferably, the aliphatic portion of these surface active agents should be straight hydrocarbon chains since these surface active agents appear to be better foam stabilizers than those having branched chains. Also, the carbon numbers for the aliphatic portion should be relatively high, C8 or higher, since the ability of such a surface active agent to stabilize a foam at high temperature increases with its carbon number. Also, materials which will combine or react in or with the silicate solution to produce a foaming agent may be satisfactorily employed. For example, unneutralized fatty acids will react with a high pH sodium silicate solution to form the sodium salt of the fatty acid. These materials are listed by way of example and not limitation. Other materials such as polymeric substances and proteins are well known to those skilled in the art for their ability to stabilize foams.

In selecting a foaming agent for use in the practice of this invention, the paramount consideration should be its ability to promote and stabilize a foam of evolved steam bubbles in the aqueous silicate solution. The materials selected should, of course, be chemically compatable with the silicate solution and should not cause excessive precipitation or complexing of the dissolved solids in the solution. Naturally, the foaming agent should not degrade the quality of the insulating coating formed on the tubing. The foaming agent should be soluble or at least dispersable in the silicate solution. In order to solubilize or disperse the foaming agent in the silicate solution, it may be introduced directly or by way of an aqueous solution. The foaming agent should not degrade, i.e., lose its ability to stabilize the liquid foam at the temperature at which it will be employed. Of course, it is desirable that the material be readily available and economic. By way of example, it has been found that sodium lauryl sulfate in concentration ranges of from about 0.01 to 1.0 per cent in a sodium silicate solution (40° B., 3.2 $SiO_2/Na_2O$ weight ratio) is an adequate and effective foaming agent. Sodium lauryl sulfate is available in a number of useful classes including USP Grade sold under the trade name Duponol C, Technical Grade sold under the trade name Duponol ME, and Commercial Grade sold under the trade name Duponol WA, all available from E.I. du Pont de Nemours and Company.

The concentration at which the foaming agent is to be employed may vary widely. The concentration will vary primarily with the particular foaming agent used. The concentration of the foaming agent is also dependent upon the temperature at which it is to be utilized, the viscosity and the pH of the solution in which it is to be employed, the estimated quantity of solution which would otherwise remain in the well, and the depth of the well.

The suitability of a particular foaming agent and the useful concentration ranges of such an agent can be easily and readily determined following simple laboratory investigation. Methods of determining the ability of a material to stabilize a foam and the concentration ranges for such materials are extensively described in the literature. In addition, the following examples describe routine investigating procedures for these stabilizing agents.

EXAMPLE I

The following tests were conducted to determine the foaming ability of substances when added to aqueous solutions of sodium silicate and the compatability of such substances with sodium silicate solutions. In these tests, three sodium silicate solutions were used. The first solution was a commercially available aqueous solution of sodium silicate (40° B., 3.2 $SiO_2/Na_2O$ weight ratio). The second solution was prepared by mixing one part water and three parts of the first solution. The third solution was prepared by mixing equal parts of water and the first solution. The second and third solutions had densities of approximately 32° B. and 23° B., respectively, and silica dioxide/sodium oxide weight ratios of 3.2. One hundred milliliters of each of the three solutions were then placed in three 500 milliliter Erlenmeyer flasks and 0.1 gram of sodium lauryl sulfate, Duponol C, was added to each of the solutions. This foaming agent dispersed as relatively fine particles in the solutions and no adverse reaction was noted between the foaming agent and the silicate solutions. The flasks were then heated on an electric hot plate to bring the mixtures to a boil. During this boiling a head or column of foam was formed above the boiling liquid in each of the flasks. In each instance, the head of foam extended to the top of the flask. When comparable solutions of sodium silicate without the foaming agent were boiled, no appreciable amount of foam was present above the boiling liquid. These tests showed that the sodium lauryl sulfate was an effective foaming agent for these sodium silicate solutions and that this foaming agent did not have any apparent adverse affect on the sodium silicate solution.

A fatty acid was also tested for its effectiveness as a foaming agent. The fatty acid employed was a tall oil fatty acid sold under the trade name Acintol FA3 sold by the Arizona Chemical Company. This unneutralized fatty acid was added directly to the three previously described sodium silicate solutions at a concentration of 0.1 gram of fatty acid per 100 milliliters of sodium silicate solution. One hundred milliliters of each of the three sodium silicate-fatty acid solutions were then placed in three 500 milliliter Erlenmeyer flasks and boiled in the previously described manner. It was found that the fatty acids in the silicate solutions were effective foaming agents. No adverse reaction between the fatty acids and the silicate solutions were noted. In each instance, a head or column of foam was formed in each of the flasks and extended to the top of the flasks.

EXAMPLE II

The effectiveness of the foaming agent-silicate solution was also tested under conditions which were scaled to approximate a casing-tubing annular space in a well. A one-quarter inch OD stainless steel tube was used to approximate a tubing string. A 1-inch ID galvanized line pipe, approximately 3 feet in length, was slipped over the tubing string to approximate the casing and sealed at its top and bottom with an inlet and outlet for the stainless steel tubing. A tap was drilled at the top of the galvanized line pipe to permit filling of the annular space with the solution to be tested and to permit venting of the annular space during boiling. Six such assemblies were prepared. Approximately 700 milliliters of each of the three silicate solutions of Example I were introduced into three of these assemblies to fill their annular spaces. Three additional 700 milliliter portions of the three silicate solutions were prepared and 0.7 grams of sodium lauryl sulfate, Duponol C, was added to each of these solutions. These solutions were then introduced into the three remaining assemblies. Steam (400° F. and 250 psia) was then injected down the tubing string of the six assemblies. This steam was injected for a period of approximately 1 and ½ hours and the quantity of fluid boiled from the annular spaces through the taps at the top of the galvanized line pipe were collected in graduated cylinders. Table I below shows the quantity of fluid recovered in each instance.

TABLE I

| Sodium Silicate Solution | Annulus Boil-Off Without Foaming Agent Milliliters | Annulus Boil-Off With Foaming Agent Milliliters |
| --- | --- | --- |
| 40° Baume | 400 | 490 |
| 32° Baume | 440 | 570 |
| 23° Baume | —* | 650 |

*400 milliliters measured. However, due to vigorous boiling, much steam escaped from graduated cylinder.

The above Table demonstrates the superior efficiency of the foaming agent in removing excess solution from the casing-tubing annulus. In each instance, the quantity of liquid removed from the annulus and collected in the graduated cylinders was greater when the foaming agent was present in the sodium silicate solution. It should be noted that the quality of the sodium silicate coating on the tubing was apparently superior when the foaming agent was used. The coating formed in the presence of the foaming agent was more regular and was more evenly deposited along the length of the tubing.

The principle of the invention and the best mode in which it is contemplated to apply that principle have been described. It is to be understood that the foregoing is illustrative only and that other means and techniques can be employed without departing from the true scope of the invention as defined in the following claims.

What is claimed is:

1. A process for thermally insulating a tubing string suspended within a well which comprises injecting into the annulus of the well an aqueous solution containing water-soluble silicate and a foaming agent, introducing thermal energy into the tubing string to remove water from the solution, to deposit a coating of the silicate on the tubing string and to cause the solution to foam within the annulus, and venting the annulus to provide a discharge for water vapor and foamed solution.

2. A process as defined by claim 1 wherein the concentration of the foaming agent in the aqueous solution is from about 0.01 to about 1.0 weight per cent.

3. A process as defined by claim 2 wherein the foaming agent is an ionic monovalent surface active agent.

4. A process as defined by claim 3 wherein the ionic monovalent surface active agent is sodium lauryl sulfate.

5. A process as defined by claim 3 wherein the ionic monovalent surface active agent is a neutralized salt of a fatty acid.

6. A process as defined by claim 5 wherein the fatty acid is neutralized by the aqueous solution.

7. A process as defined by claim 1 wherein the aqueous solution is injected into the annulus by injecting the solution down the tubing, through flow communication means on the tubing, and up the annulus.

8. A process as defined by claim 1 wherein the water-soluble silicate is sodium silicate having a silica dioxide/sodium oxide weight ratio of approximately 3.2 and a density of from about 22° B. to about 40° B.

9. A process as defined by claim 1 wherein the thermal energy is steam.

10. A process for thermally insulating a tubing string suspended within a well which comprises introducing into the annulus of the well an aqueous solution of sodium silicate having a density of from about 22° B. to about 40° B. and a silica dioxide/sodium oxide weight ratio of about 3.2 and containing from about 0.01 to 1.0 weight per cent sodium lauryl sulfate, introducing steam into the tubing to boil the solution, to deposit a coating of sodium silicate on the tubing, and to create a foam of water vapor and aqueous solution within the annulus, and venting the annulus to remove water vapor and foamed aqueous solution.

* * * * *